US 6,688,574 B2

United States Patent
Okazaki et al.

(10) Patent No.: US 6,688,574 B2
(45) Date of Patent: Feb. 10, 2004

(54) SEAT SLIDING DEVICE FOR A VEHICLE

(75) Inventors: Hiroyuki Okazaki, Chiryu (JP); Yukifumi Yamada, Toyota (JP); Hideo Nihonmatsu, Anjo (JP); Yasuhiko Mori, Kakamigahara (JP); Takuo Yanagihara, Kakamigahara (JP)

(73) Assignees: Aisin Seiki Kabushiki Kaisha, Kariya (JP); Gifu Shatai Kogyo Kabushiki Kaisha, Kakamigahara (JP)

( * ) Notice: Subject to any disclaimer, the term of this patent is extended or adjusted under 35 U.S.C. 154(b) by 0 days.

(21) Appl. No.: 09/989,444

(22) Filed: Nov. 21, 2001

(65) Prior Publication Data

US 2002/0060281 A1 May 23, 2002

(30) Foreign Application Priority Data

Nov. 21, 2000 (JP) ........................... 2000-354556

(51) Int. Cl.[7] .............................................. F16M 13/00
(52) U.S. Cl. .......................... 248/424; 248/429; 248/430
(58) Field of Search ................................ 248/424, 429, 248/430, 298.1

(56) References Cited

U.S. PATENT DOCUMENTS

| 4,109,973 | A |   | 8/1978  | Terada |
|-----------|---|---|---------|--------|
| 4,210,303 | A |   | 7/1980  | Torta et al. |
| 4,776,551 | A | * | 10/1988 | Nishino ............... 248/429 |
| 4,804,229 | A | * | 2/1989  | Nishino ............... 297/471 |
| 5,048,787 | A | * | 9/1991  | Saitoh ............... 248/430 |
| 5,806,825 | A | * | 9/1998  | Couasnon ............... 248/429 |
| 5,842,383 | A |   | 12/1998 | Yamada et al. |
| 5,918,847 | A | * | 7/1999  | Couasnon ............... 248/430 |
| 5,931,436 | A | * | 8/1999  | Rohee ............... 248/430 |
| 6,079,688 | A | * | 6/2000  | Levillain et al. ............ 248/429 |
| 6,086,154 | A | * | 7/2000  | Mathey et al. ............... 297/341 |
| 6,113,051 | A |   | 9/2000  | Moradell et al. |
| 6,227,596 | B1 | * | 5/2001 | Foucault et al. ......... 296/65.13 |
| 6,286,799 | B1 | * | 9/2001 | Fujii ............... 248/430 |
| 6,354,553 | B1 | * | 3/2002 | Lagerweij et al. .......... 248/430 |
| 2001/0050504 | A1 |  | 12/2001 | Yamada et al. |

FOREIGN PATENT DOCUMENTS

| DE | 27 16 549 C3 | 8/1981 |
| DE | 28 21 605 C2 | 2/1986 |
| EP | 0 960 763 A2 | 12/1999 |
| GB | 444752 | 3/1936 |
| JP | 9-48268 A | 2/1997 |
| JP | 11-189077 A | 7/1999 |
| JP | 2002-172959 A | 6/2002 |

* cited by examiner

Primary Examiner—Kimberly Wood
(74) Attorney, Agent, or Firm—Burns, Doane, Swecker & Mathis, LLP

(57) ABSTRACT

A vehicle seat sliding device includes a lower rail adapted to be fixed to the floor of the vehicle, an upper rail adapted to be fixed to the vehicle seat and mounted on the lower rail for forward and rearward movement, and a releasable lock mechanism disposed between the lower rail and the upper rail for locking the upper rail. The lock mechanism has a lock lever disposed within sections of the upper and lower rails and extending forward and rearward, with the lock lever being movably mounted on the upper rail. A nail portion is formed on the lock lever and is adapted to be selectively fitted into engaging holes formed on the upper and lower rails from inside the upper and lower rails toward outside. An urging mechanism is positioned within the sections of the lower and upper rails for urging the lock lever toward its locking condition, and an operating mechanism operates the lock lever.

22 Claims, 13 Drawing Sheets

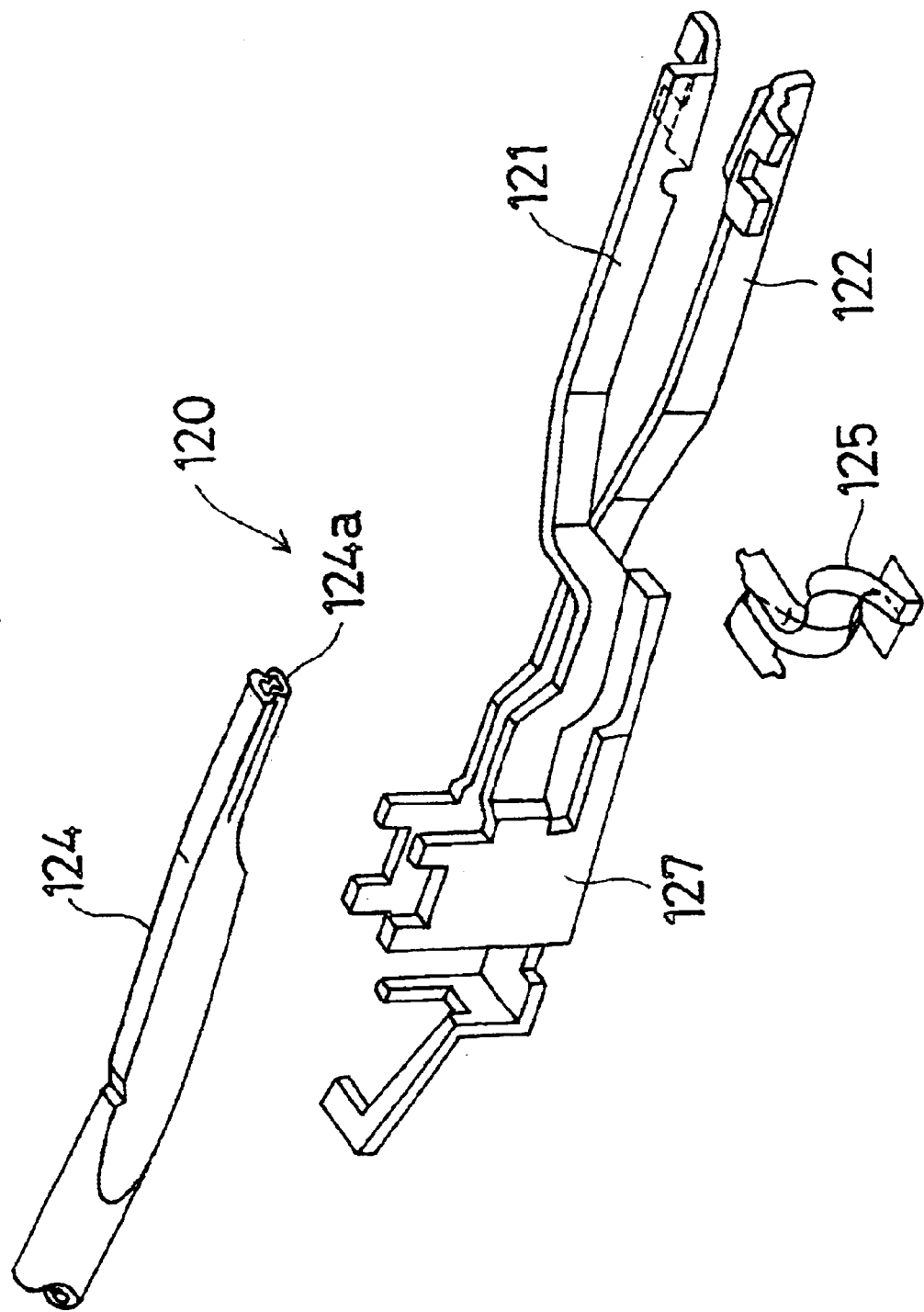

SEAT SLIDING DEVICE FOR A VEHICLE

This application is based on and claims priority under 35 U.S.C. §119 with respect to Japanese Patent Application No. 2000-354556 filed on Nov. 21, 2000, the entire content of which is incorporated herein by reference.

FIELD OF THE INVENTION

This invention generally relates to a vehicle seat. More particularly, the present invention pertains to a seat sliding device for a vehicle having a lock mechanism for releasably locking the seat in place.

BACKGROUND OF THE INVENTION

A known seat sliding device is disclosed in published European Patent Application No. EP 0960763 A2. This seat slide device includes a lock lever forming a component of a lock mechanism. The lock lever is movably and rotatably mounted on an upper rail through a pin. Nail portions which are formed on the lock lever are fitted into engaging holes formed on the upper and lower rails so that the upper rail can be locked to the lower rail.

With this construction, various components of the lock mechanism such as the lock lever and the pin which supports the lock lever are disposed outside the upper rail and the nail portions of the lock lever are fitted into the engaging holes from the outside of both rails toward the inside of the rails. Therefore, it is necessary to provide a space for allowing the movement of the components and the movement and rotation of the lock lever at the outside of both rails. This typically requires a relatively large space.

A need thus exists for an improved seat sliding device for a vehicle which is not as susceptible to the drawbacks discussed above.

SUMMARY OF THE INVENTION

According to the present invention, a seat sliding device for a vehicle includes a lower rail adapted to be fixed to the floor of the vehicle, an upper rail adapted to be fixed to the vehicle seat and movably mounted on the lower rail for forward and rearward movement, and a releasable lock mechanism disposed between the lower rail and the upper rail for locking the upper rail in position relative to the lower rail. The lock mechanism has a lock lever disposed within sections of the upper and lower rails and extending forward and rearward, with the lock lever being movably mounted on the upper rail. The lock mechanism also has a nail portion formed on the lock lever and adapted to be selectively fitted into engaging holes formed on the upper and lower rails from inside the upper and lower rails toward outside the upper and lower rails, an urging mechanism positioned within the sections of the lower and upper rails for urging the lock lever toward its locking condition, and an operating mechanism for operating the lock lever.

The lock lever and the urging mechanism forming components of the lock mechanism are disposed in the sections of both rails, and the nail portion of the lock lever is fitted into the engaging holes from the inside of both rails toward the outside. Therefore, it is not necessary to maintain a space for allowing the movement of the components of the lock mechanism and the movement and rotation of the lock lever at the outside of both rails. Thus, a relatively compact seat sliding device can be obtained.

According to another aspect of the invention, a seat sliding device for a vehicle includes a lower rail adapted to be fixed to the floor of the vehicle and provided with a plurality of engaging holes, and an upper rail adapted to be fixed to a seat of the vehicle and movably mounted on the lower rail for forward and rearward movement, with the upper rail being provided with a plurality of engaging holes and having a pair of side walls. A lock lever is movably mounted on the upper rail at a position between the side walls of the upper rail, and includes outwardly extending engaging portions that engage the engaging holes in the lower and upper rails to lock the upper rail relative to the lower rail. A spring member is positioned between the side walls of the upper rail and applies a biasing force to the lock lever urging the engaging portions outwardly to engage the engaging holes of the upper and lower rails.

In accordance with another aspect of the invention, a vehicle seat sliding device includes a lower rail adapted to be fixed to the floor of the vehicle and an upper rail adapted to be fixed to the vehicle seat and movably mounted on the lower rail for forward and rearward sliding movement, with the upper rail and lower rail together defining an interior. A lock lever is movably mounted on the upper rail, is positioned within the interior of the upper and lower rails and has engaging portions that extend outwardly towards the exterior of the upper and lower rails to engage the engaging holes in the lower and upper rails to lock the upper rail relative to the lower rail. A spring member is operatively associated with the lock lever to urge the engaging portions outwardly into engagement with the engaging holes of the upper and lower rails, and an operation member is operatively associated with the lock lever to move the lock lever in a direction for disengaging the engaging portions from the engaging holes in the upper and lower rails.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 19 is an exploded perspective view of a lock mechanism according to a modified version of the second embodiment shown in FIG. 10.

DETAILED DESCRIPTION OF THE INVENTION

Figure 1:
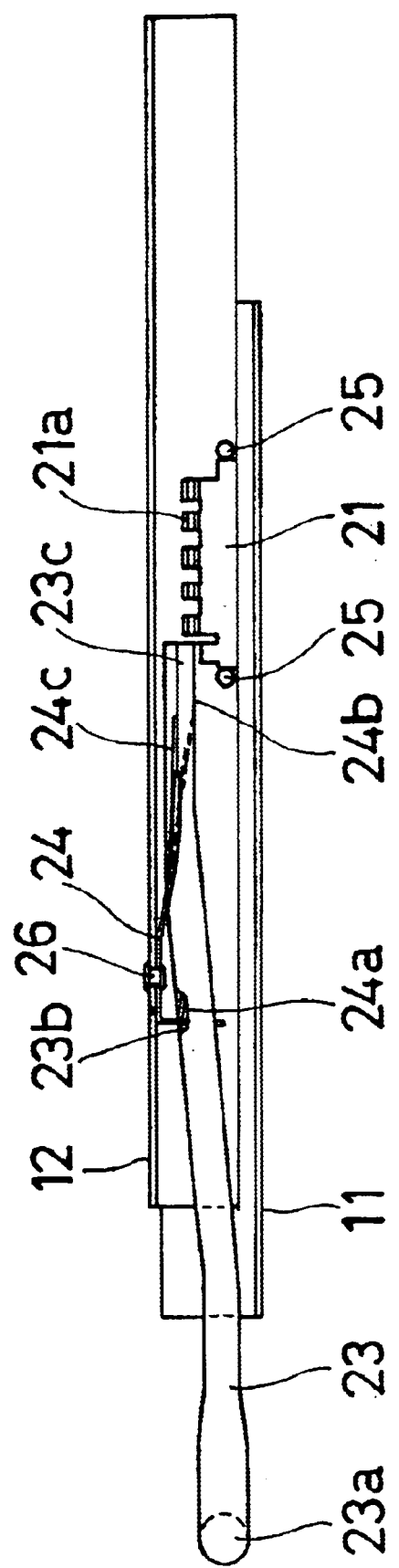
FIG. 1 is a side view of a portion of a vehicle seat slide device according to one embodiment of the present invention.
Figure 2:
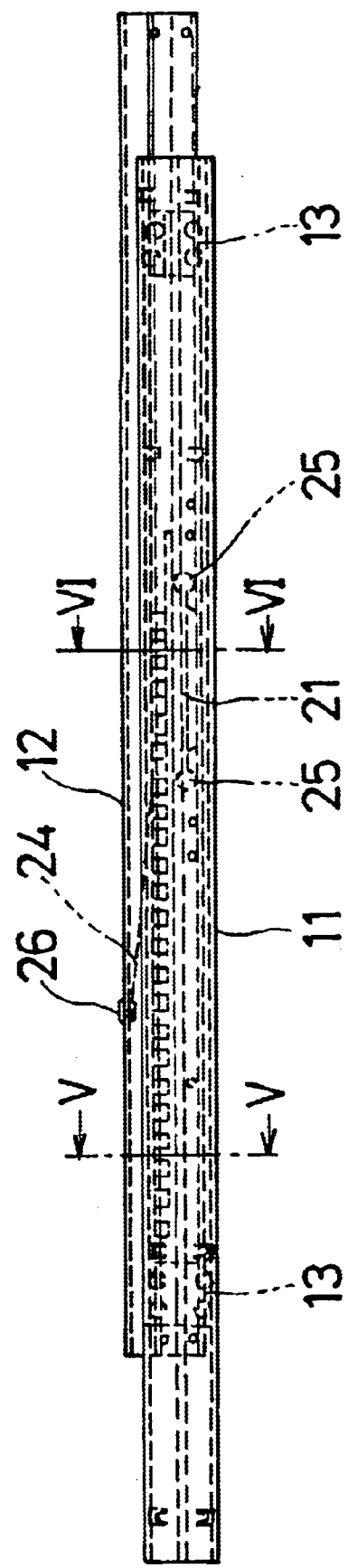
FIG. 2 is a detailed side view of the vehicle seat sliding device shown in FIG. 1.
Figure 3:
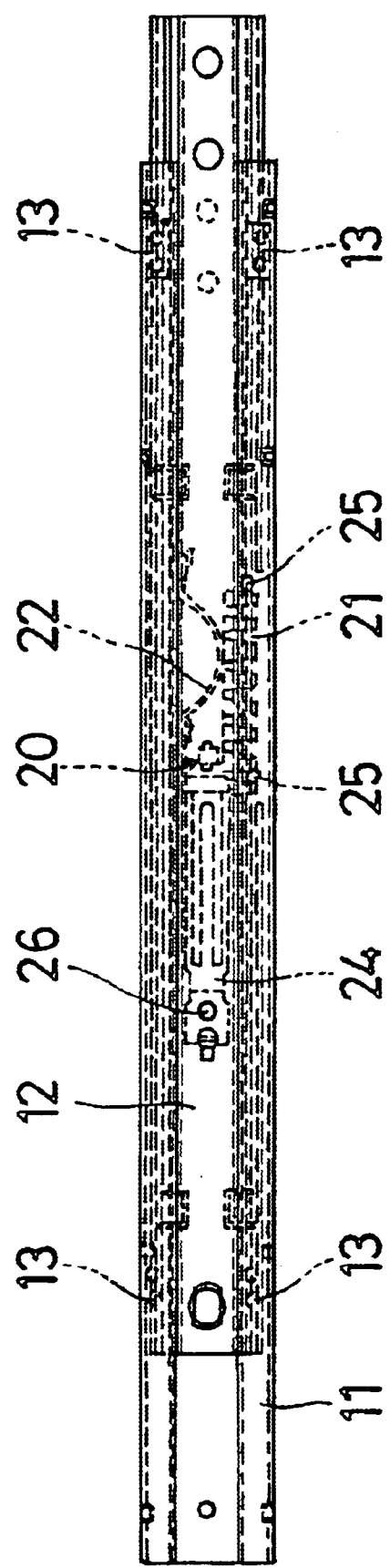
FIG. 3 is a plan view of the vehicle seat sliding device shown in FIG. 1.

FIGS. 1–9 illustrate a first embodiment of a vehicle seat sliding device in accordance with the present invention. The vehicle seat sliding device includes a pair of lower rails 11 (forming right and left lower rails) fixed to the floor of the vehicle and a pair of upper rails 12 (forming right and left upper rails) fixed to the vehicle seat. Each of the upper rails 12 is mounted on respective one of the lower rails 11. It is to be understood that the drawing figures illustrate the upper and lower rails on one side of the vehicle seat, it being understood that a similar arrangement exists on the other side of the vehicle seat. Each side of the vehicle seat is also provided with a lock mechanism having a construction described below. The upper and lower rails each include oppositely positioned side walls defining an interior or the section of the rails. The upper rail and lower rail on each side of the vehicle seat thus together define an interior in which is positioned at least a part of the respective lock mechanism.

The upper rails 12 are slidably movable over a predetermined distance or amount in the forward and rearward directions relative to the lower rails through four ball units 13. The vehicle seat sliding device also includes a lock mechanism 20 disposed between each of the lower rails 11 and upper rails 12. Each ball unit 13 is constituted by four balls 13a and a holder 13b which rotatably supports the balls 13a.

Figure 4:
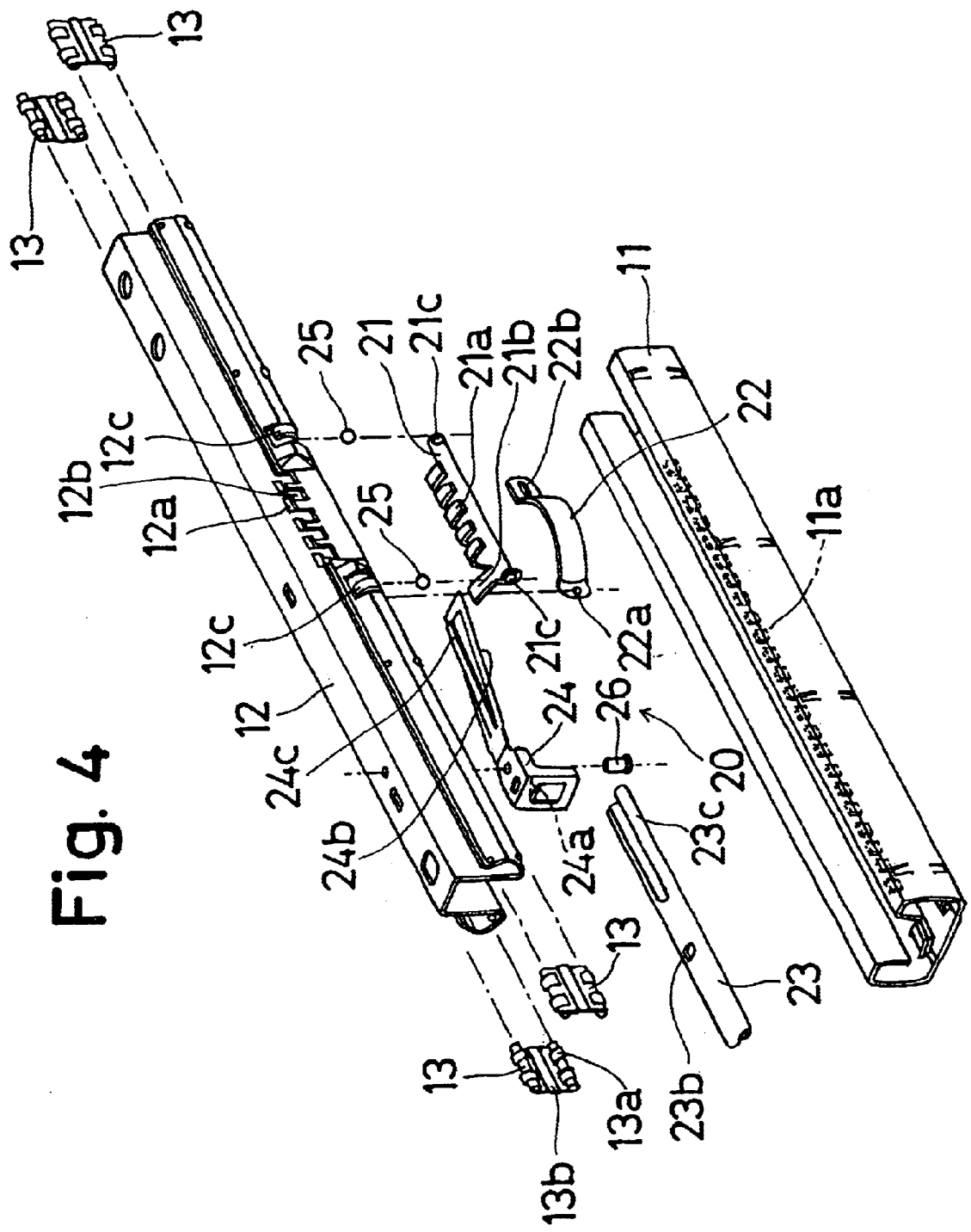
FIG. 4 is an exploded perspective view of the seat sliding device shown in FIG. 1.
Figure 5:
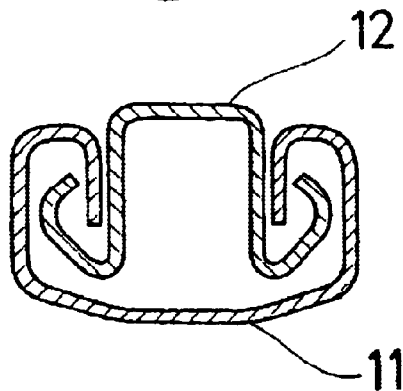
FIG. 5 is an enlarged cross-sectional view of the seat sliding device taken along the section line V—V in FIG. 2.

The lock mechanism 20 releasably locks the upper rails 12 to the lower rails 11 on each side of the vehicle seat. The term "lock" means that the upper rails are fix so as to be incapable of moving in the forward and rearward directions. As shown in FIG. 4, the lock mechanism 20 includes a lock lever 21, a spring member 22, an operation lever 23, a plate shaped elastic member 24, a pair of balls 25 and a pin 26.

The lock lever 21 is disposed within the sections of both rails 11, 12 so as to extend forward and rearward, and is movably mounted on each upper rail 12. The lock lever 21 includes nail portions or protrusions 21a which are adapted to fit into rectangular engaging holes 11a, 12a formed on both the lower and upper rails 11, 12 and rectangular notches 12b formed on each upper rail 12. The nail portions 21a are adapted to fit into or engage the holes 11a, 12a and the notches 12b from the inside of the rails 11, 12 toward the outside of the rails. The lock lever 21 also includes an arm 21b which is adapted to be pushed by the operation fryer 23.

Figure 7:
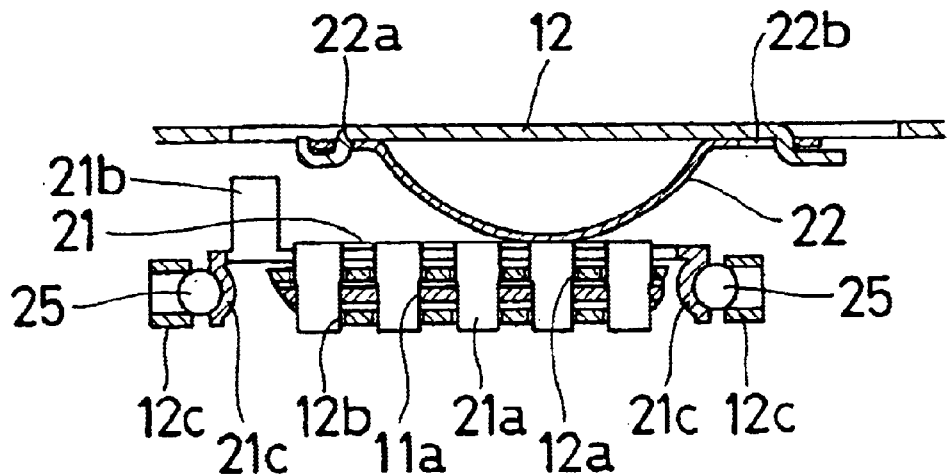
FIG. 7 is a longitudinal cross-sectional view of a portion of the vehicle seat sliding device showing the locked condition of the vehicle seat sliding device.

The lock lever 21 has a pair of roughly hemispherically shaped bearing portions 21c formed at the forward and rearward ends of the lock lever 21. As shown in FIG. 4, the bearing portions 21c extend in the lateral direction. A pair of balls 25 is also provided, with each ball 25 engaging and contacting one of the bearing portions 21c at the outer side (front side and rear side, respectively) as shown in FIG. 7. As also illustrated in FIG. 7, the balls 25 are pressed to the respective bearing portions 21c by a pair of roughly cylindrically shaped curl portions or ball engaging portions 12c which are formed on the upper rail 12 by bending. Thus, the lock lever 21 is mounted on each upper rail 12 at a pair of balls 25 and a pair of curl portions 12c so as to be able to move and pivot.

The spring member 22 is disposed between the lock lever 21 and the upper rail 12 within the sections of both rails 11, 12. The spring member 22 has a hole 22a at its front end and an elongated hole 22b at its rear end. The spring member 22 is fixed to each upper rail 12 at the hole 22a and is mounted on each upper rail 12 at the elongated hole 22b so as to be able to move forward and rearward. The spring member 22 has an arc shaped bent portion its center and engages the lock lever 21 at its arc shaped bent portion to urge the lock lever 21 toward the locking condition.

The operation lever 23 operates the lock lever 21 to move and rotate. The operation lever 23 has an operating portion 23a which extends forward from the front end of the upper rail 12. The operation lever 23 is mounted on the upper rail 12 through the plate shaped elastic member 24 so as to be movable in the upper rail 12. The operation lever 23 simultaneously operates the right and left lock levers 21 and is connected to the right and left lock levers at the operating portion 23a. Generally speaking, the operation lever 23 is called a loop handle.

The elastic member 24 is riveted to the upper rail 12 by way of a pin 26. The elastic member 24 includes a support arm 24a which is engaged with an engaging hole 23b of the operation lever 23 to movably support the operation lever 23, a generally U-shaped supporting portion 24b, and an I-shaped supporting portion 24c which elastically holds the rear end portion 23c of the operation lever 23 having a U-shaped cross section. The rear end of the U-shaped supporting portion 24b engages a lower face of the rear end portion 23c of the operation lever 23. The rear end of the I-shaped supporting portion 24c engages the upper surface of the rear end portion 23c of the operation lever 23 (i.e., the bottom surface of the U-shaped cross section).

Figure 6:
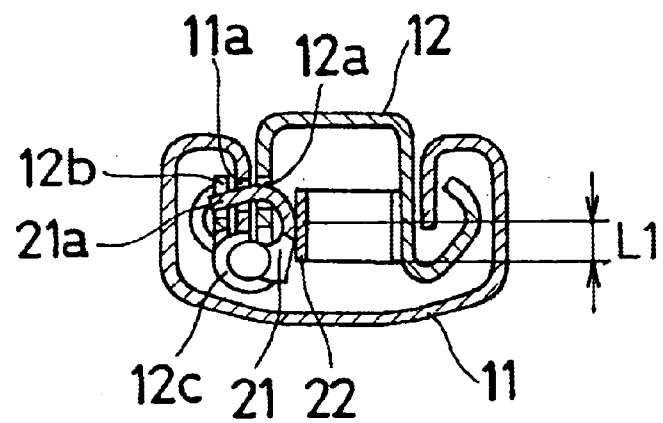
FIG. 6 is an enlarged cross-sectional view of the seat sliding device taken along the section line VI—VI in FIG. 2.

With the above-described construction, when the operation lever 23 is not operated, the lock lever 21 is urged toward the locking condition by the spring member 22 as shown in FIGS. 6 and 7 and is held. That is, the nail portions 21a fit into the engaging holes 11a, 12a and the notch 12b from the inside of both rails 11, 12 toward the outside of the rails. Therefore, the upper rails 12 are locked so as to be incapable of moving relative to the lower rails 11.

Figure 8:
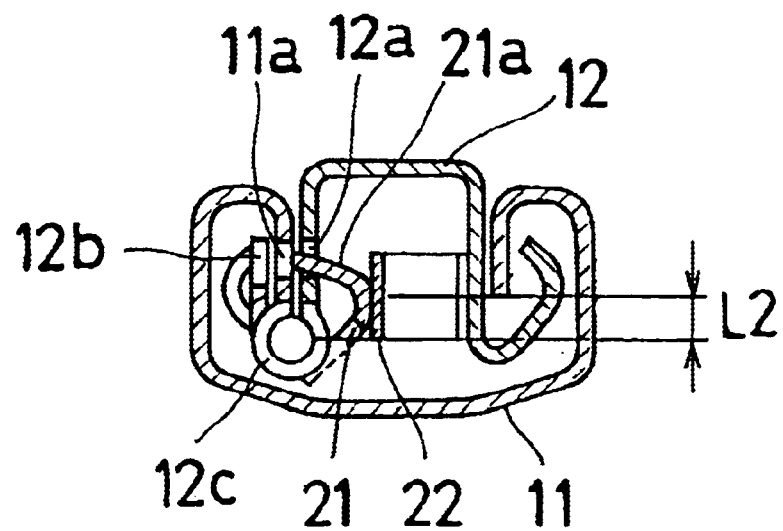
FIG. 8 is a cross sectional view of the part of the vehicle seat sliding device shown in FIG. 6 illustrating a lock released condition of the vehicle seat sliding device.
Figure 9:
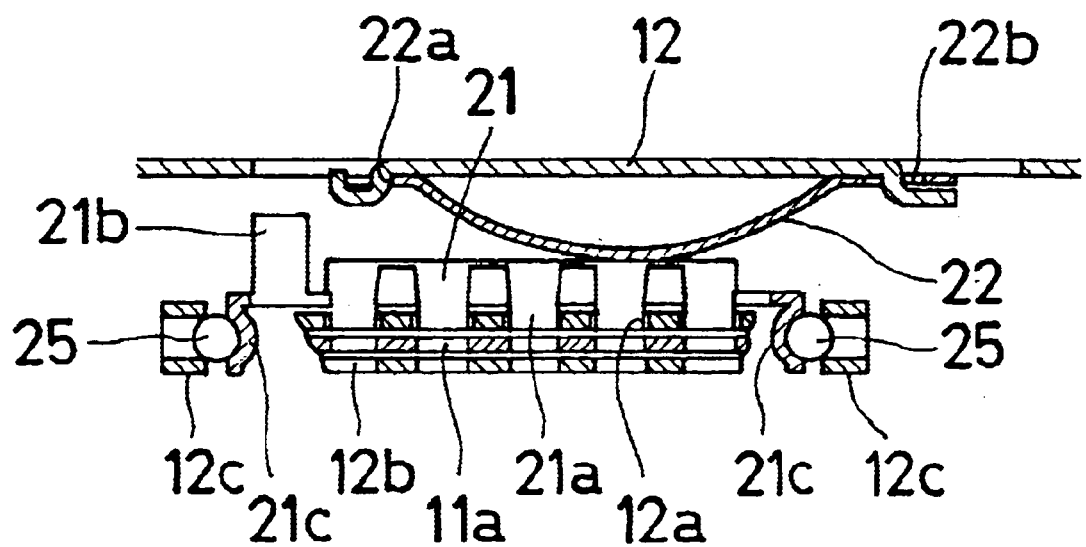
FIG. 9 is a longitudinal cross-sectional view similar to FIG. 7 illustrating the lock released condition of the vehicle seat sliding device.
Figure 10:
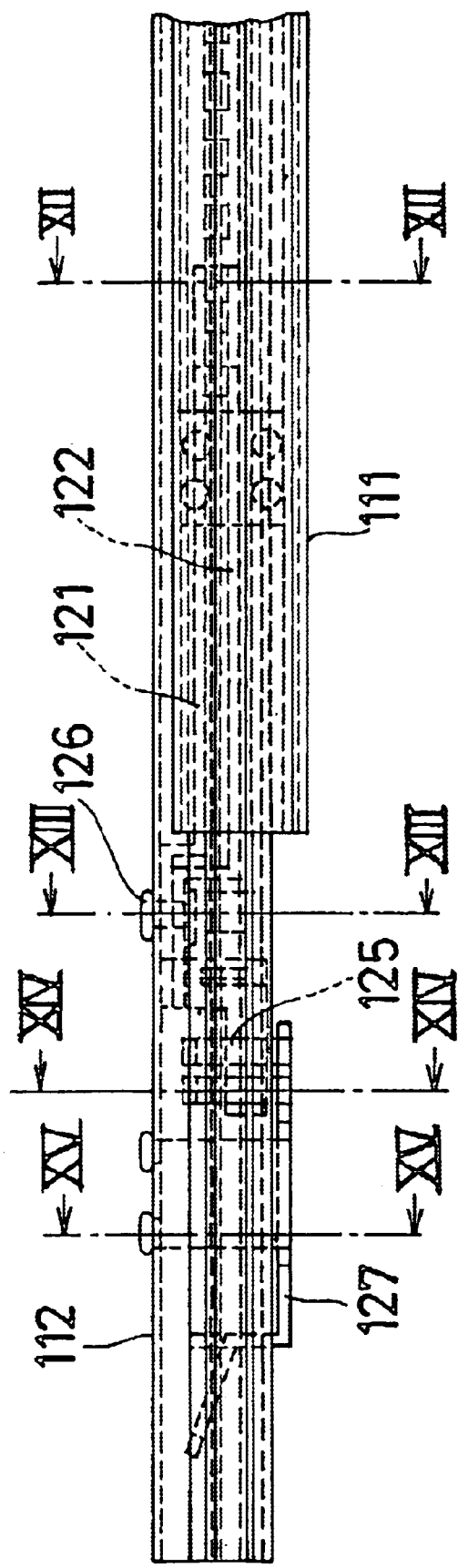
FIG. 10 is a side view of a second embodiment vehicle seat sliding device.
Figure 11:
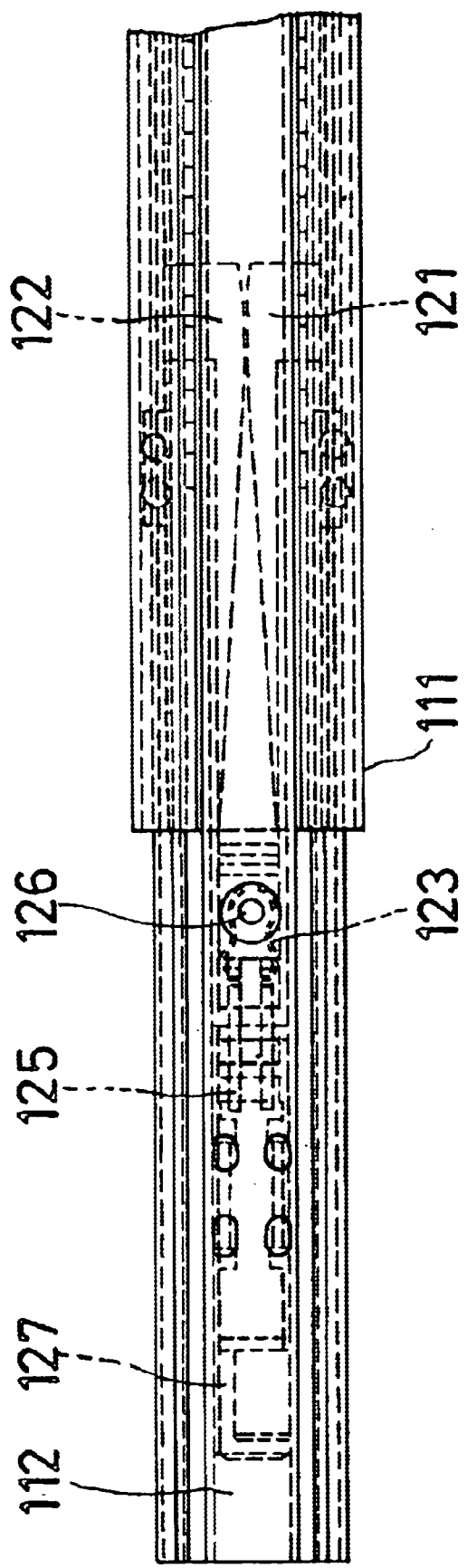
FIG. 11 is a plan view of the vehicle seat sliding device shown in FIG. 10.

When the operation lever 23 is operated by lifting up the operating portion 23a, the lock lever 21 is moved and rotated against the spring member 22 as shown in FIGS. 8 and 9 (through engagement between the elastic member 24 and the arm 21b of the lock lever 21), and the nail portions 21a are pulled out of or are disengaged from the notches 12b of the upper rail 12 and the engaging holes 11a of the lower rail 11. Thus, the lock condition of the lock mechanism 20 is released and the upper rails 12 can move relative to the lower rails 11.

In this first embodiment of the vehicle seat sliding device, the lock lever 21 and the spring member 22 which are components of the lock mechanism 20 are disposed in the sections or the interior of both rails 11, 12, In addition, the nail portions 21a of the lock lever 21 are fitted into the engaging holes 11a, 12a and the notches 12b from the inside of both rails 11, 12 toward the outside of the rails. Therefore, it is not necessary to provided a space for allowing the movement of the components of the lock mechanism 20 and the movement and rotation of the lock lever 21 at the outside of the rails 11, 12. The result is a relatively compact vehicle seat sliding device.

In addition, because the operating mechanism for operating the lock lever 21 includes the operation lever 23 having the operating portion 23a extending forward from the front end of the upper rail 12 and movably supported on the upper rail 12 within the upper rail 12, and also includes the plate shaped elastic member 24 mounted on the upper rail 12 and elastically holding the operation lever 23, it is possible to regulate the movement of the operation lever 23 by the elastic member 24. Therefore, it is possible to substantially inhibit or prevent rattling of the operation lever 23.

Also, the lock lever 21 is mounted on each upper rail 12 at the pair of bearing portions 21c through the pair of balls 25 and the pair of curl portions 12c, which form elastic bearing portions, so that the lock lever is able to move and pivot relative to the upper rail 12. In addition, the movement of the lock lever 21 forward and rearward is allowed by the elastic deformation of each of the bearing portions 21c. Therefore, as shown in FIG. 7, in the event the nail portions 21a are closely fitted into the engaging holes 11a of the lower rail 11 with no clearance or substantially no clearance, and are fitted in the engaging holes 12a and the notches 12b of the upper rail 12 with a prescribed clearance, the play generated forward and rearward between the nail portions 21a and the engaging holes 12a and the notches 12b of the upper rail 12 can be elastically absorbed.

Further, as shown in FIGS. 6 and 8, the base portion of each of the nail portions 21a is bent and the engaging position between the spring member 22 and the lock lever 21 is moved in response to the movement or rotation of the lock lever 21. Accordingly, because the length or distance L1 between the pivot center of the lock lever 21 and the engaging position (shown in FIG. 6) decreases to the length or distance L2 (shown in FIG. 8) in accordance with the increase of the urging force of the spring member 22, the operational force of the operation lever 23 hardly changes and so a good operational feeling can be obtained.

In this first embodiment, the lock mechanism 20 is constituted by, for example, the lock lever 21, the spring member 22, the operation lever 23, the elastic member 24, the balls 25 and the pin 26. However, in accordance with a second embodiment shown in FIGS. 10–18, a lock mechanism 120 can be constituted by, for example, a pair of lock levers 121, 122, a spring member 123, an operation lever 124, a plate shaped elastic member 125, a pin 126 and a holder 127.

Figure 16:
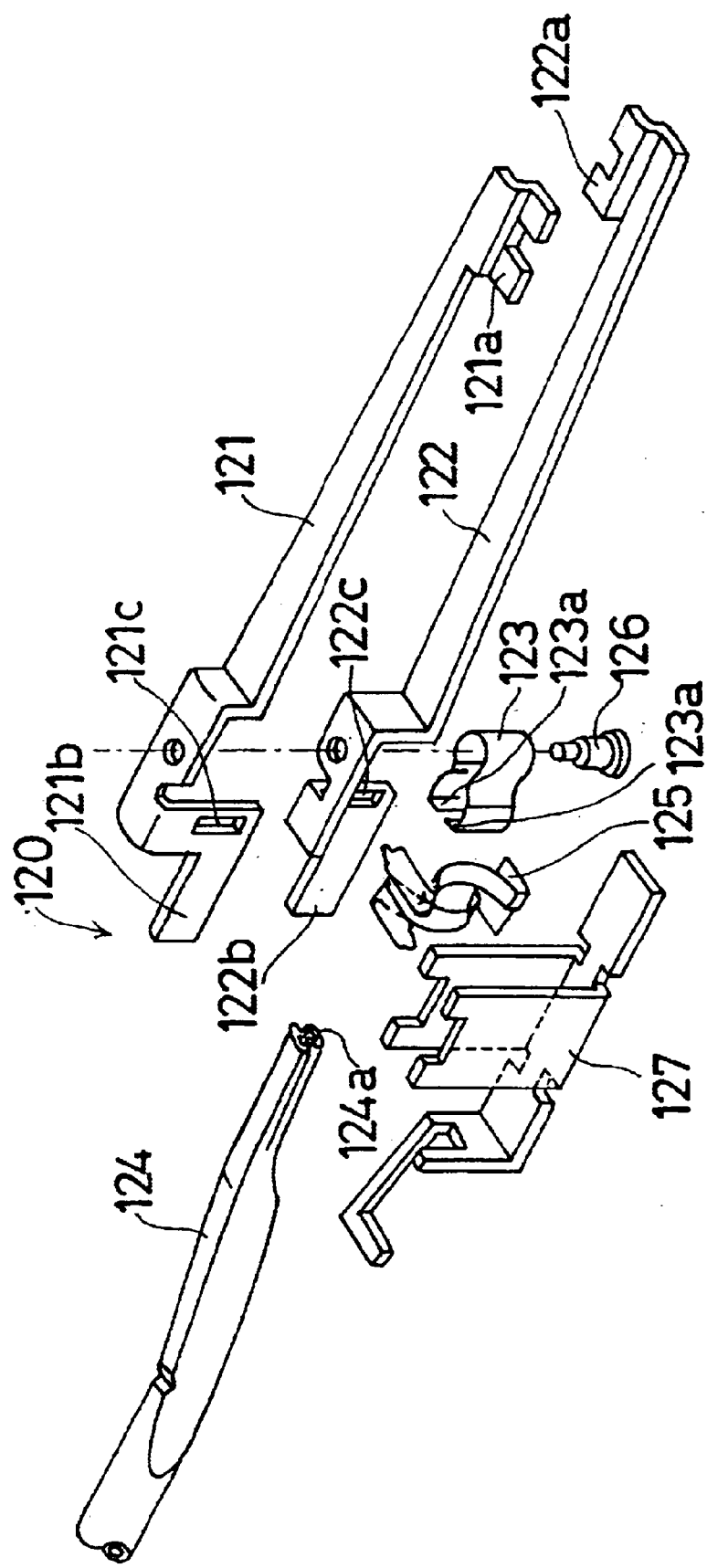
FIG. 16 is an exploded perspective view of the lock mechanism of the vehicle seat sliding device shown in FIG. 10.
Figure 17:
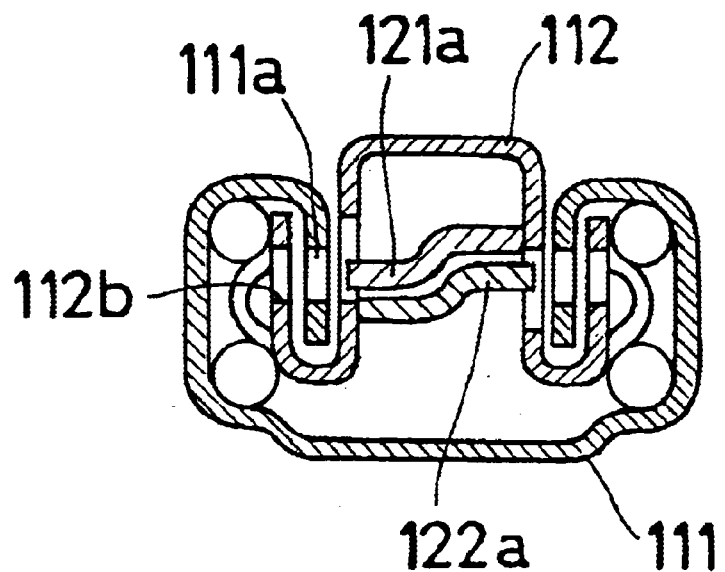
FIG. 17 is an enlarged cross-sectional view of the portion of the vehicle seat sliding device shown in FIG. 12 illustrating the lock released condition.

The pair of lock levers 121, 122 are disposed within the sections or the interiors of both rails 111, 112 and extend in the forward and rearward direction. The lock levers 121, 122 are riveted to the upper rail 112 at their upper ends through the pin 126 and are mounted on the upper rail 112 so as to be able to move and pivot. The lock levers 121, 122 have nail portions 121a, 122a which are fitted into rectangular engaging holes 111a, 112a formed on both rails 111, 112 and rectangular engaging holes 112b formed on each upper rail 112. The nail portions 121a, 122a extend from the inside of both rails 111, 112 toward the outside of the rails. The lock levers 121, 122 also have arms 121b, 122b which are pushed by the operation lever 124 through the elastic member 125. As seen in FIGS. 16 and 17, the nail portions 121a are bent downward while the nail portions 122a are bent upward so that the nail portions 121a, 122a are arranged at generally the same level.

The spring member 123 is a plate spring which is formed to possess a generally U-shaped form and is disposed around the outer circumference of the pin 126 within the sections or interior of both rails 111, 112. The spring member 123 is provided with a pair of engaging portions 123a formed at the front end of the spring member 123 so as to be positioned opposite one another. As illustrated in FIG. 16, the engaging portions 123a extend inwardly towards one another. Each of the engaging portions 123a is engaged with a respective engaging hole 121c, 122c provided in the lock levers 121, 122. The spring member 123 thus urges the lock levers 121, 122 toward the lock condition.

The operation lever 124 operates the lock levers 121, 122 to move and rotate through the elastic member 125. The operation lever 124 has an operating portion which extends forward from the front end of the upper rail 112. The operation lever 124 is mounted on the upper rail 112 through the holder 127 so as to be movable in the upper rail 112.

The elastic member 125 is mounted on the holder 127 at its lower end to form a unitary body. The elastic member 125 engages the rear end 124a of the operation lever 124 at its upper end and engages with both lock levers 121, 122 at its central bent portion. When the upper end of the elastic member 125 is pushed downward by the rear end 124a of the operation lever 124 as a result of lifting the operation portion of the operation lever 124, the central bent portion deforms outwardly in the right and left direction. The lock levers 121, 122 are thus pushed against the spring members 123.

Figure 12:
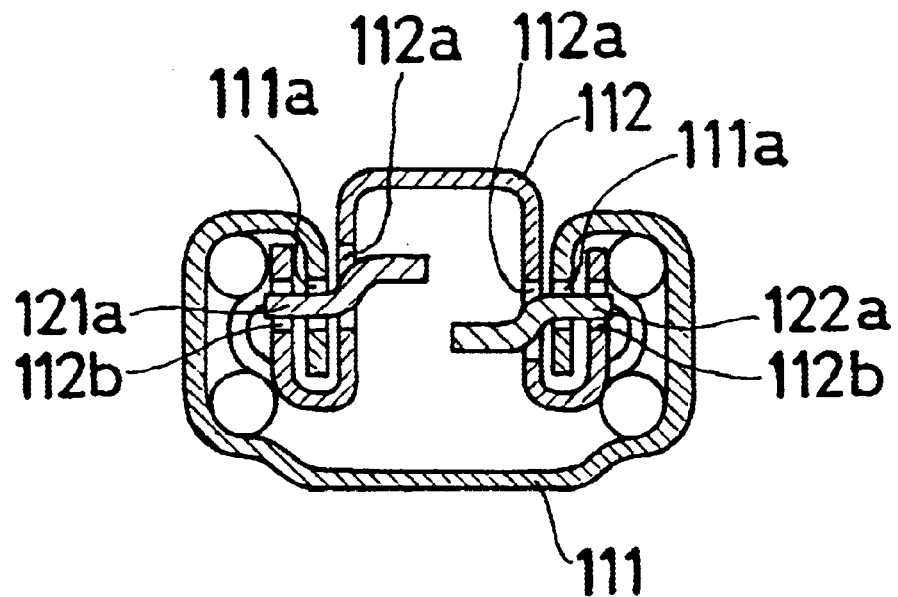
FIG. 12 is an enlarged cross-sectional view of the vehicle seat sliding device taken along the section line XII—XII in FIG. 10.
Figure 13:
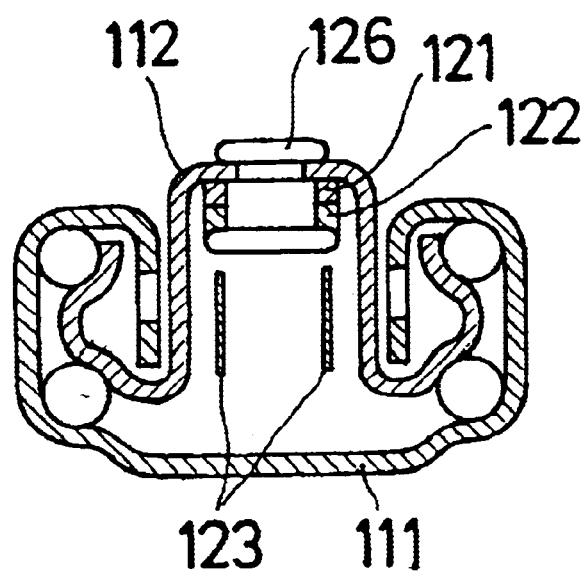
FIG. 13 is an enlarged cross-sectional view of the vehicle seat sliding device taken along the section line XIII—XIII in FIG. 10.
Figure 14:
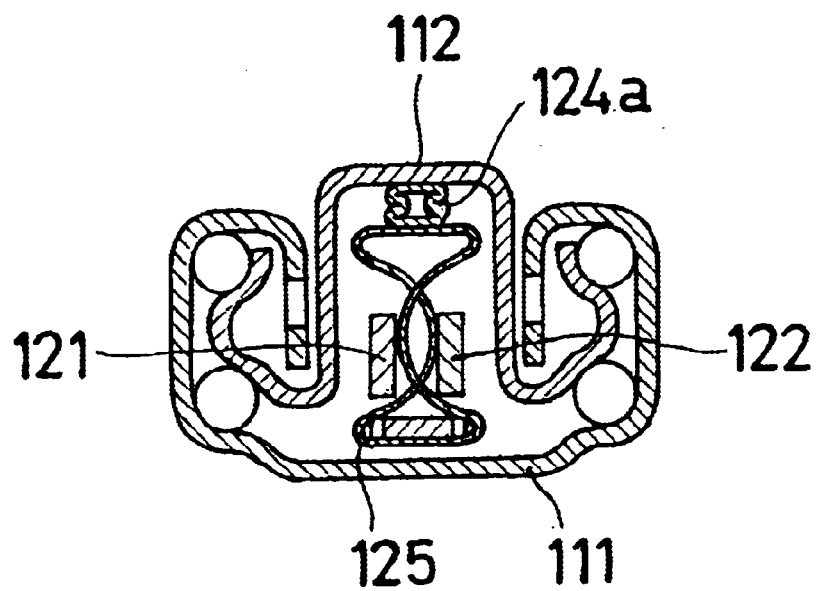
FIG. 14 is an enlarged cross-sectional view of the vehicle seat sliding device taken along the section line XIV—XIV in FIG. 10.
Figure 15:
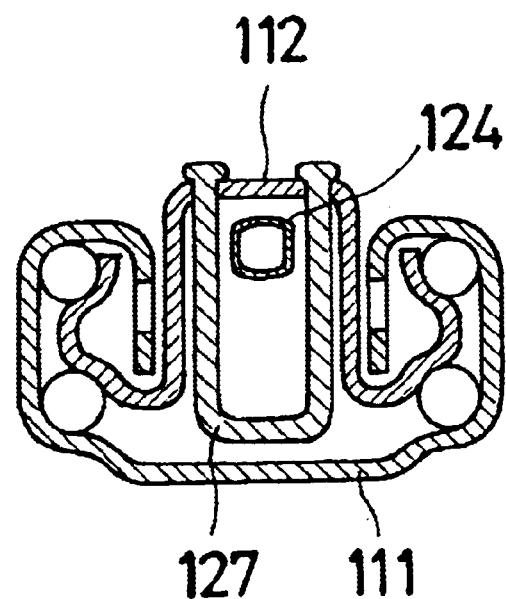
FIG. 15 is an enlarged cross-sectional view of the vehicle seat sliding device taken along the section line XV—XV in FIG. 10.

In the above-described second embodiment, when the operation lever 124 is not operated, both lock levers 121, 122 are urged toward the locking condition by the spring member 123 as shown in FIG. 12 and FIG. 14 and are held in that condition. That is, the nail portions 121a, 122a are fitted into the engaging holes 111a, 112a, 112b from the inside of the rails 111, 112 toward the outside of the rails. Therefore, the upper rails 112 are locked and incapable of moving relative to the lower rails 111.

Figure 18:
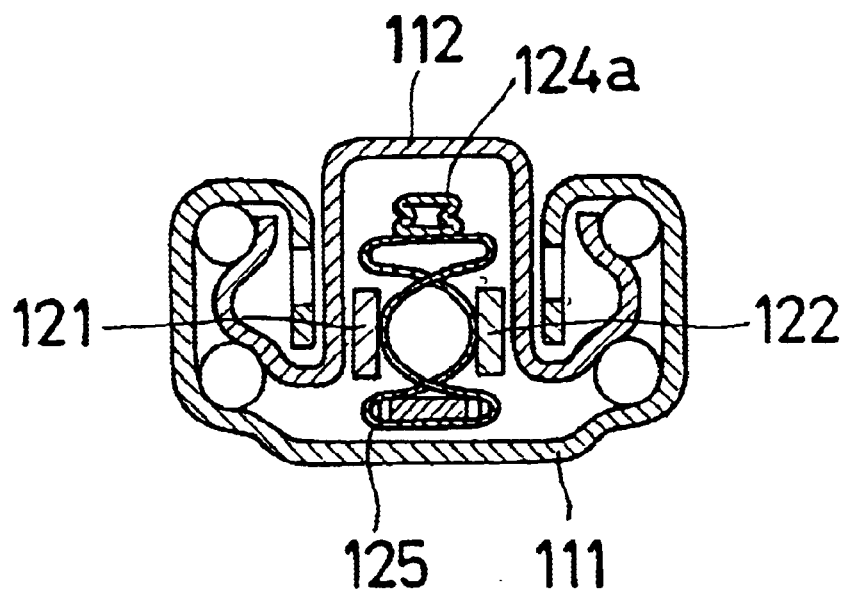
FIG. 18 is an enlarged cross-sectional view of the portion of the vehicle seat sliding device shown in FIG. 14 illustrating the lock released condition.

When the operation lever 124 is operated by lifting up the operating portion, both lock levers 121, 122 are moved and rotated against the spring member 123 as shown in FIGS. 17 and 18 and the nail portions 121a are pulled out from the engaging holes 111a, 112b of both rails 111, 112. Thereby, the lock condition of the lock mechanism 120 is released and the upper rails 112 are able to move or slide relative to the lower rails 111.

In this second embodiment, both lock levers 121, 122, the spring member 123 and the like forming components of the lock mechanism 120 are disposed within the sections or interior of both rails 111, 112. In addition, the nail portions 121a, 122a of each of the lock levers 121, 122 are fitted into the engaging holes 111a, 112a, 112b from the inside of the rails 111, 112 toward the outside of the rails. Therefore, it is not necessary to provide a space at the outside of the rails 111, 112 for allowing the movement of the components of the lock mechanism 120 and the movement and rotation of the lock levers 121, 122. Thus, a compact seat sliding device can be obtained.

In the second embodiment, both lock levers 121, 122 are formed separately from the holder 127 and are urged toward the lock condition by the spring member 123. According to a variation on this embodiment which is shown in FIG. 19, both lock levers 121, 122 can be formed on the holder 127 so that the lock levers and the holder are formed as a unitary one-piece integral construction. The lock levers can be held in the lock condition by the elasticity of both lock levers 121, 122 at a free condition. In this case, it is possible to obtain the same advantageous effects as the second embodiment. Further, it is possible to omit the spring member 123 and the pin 126 of the second embodiment, thus simplifying the construction of the lock mechanism and reducing the manufacturing cost associated with the overall device.

In the above described embodiments, the longitudinal wall of the lower rail 11 (111) in which the engaging holes 111a (111a) are formed is disposed between the longitudinal walls of the upper rail 12 (112) in which the engaging holes 12a and the notches 12b (engaging holes 112a and engaging holes 112b) are formed. However, it is also possible to apply the present invention to a seat sliding device in which the longitudinal wall of the upper rail 12 (112) in which is formed the notches 12b (engaging holes 112b) is not provided.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat sliding device for a vehicle comprising:
   a lower rail adapted to be fixed to a floor of the vehicle;
   an upper rail adapted to be fixed to a seat of the vehicle and movably mounted on the lower rail for forward and rearward movement; and
   a releasable lock mechanism disposed relative to the lower rail and the upper rail for locking the upper rail in position relative to the lower rail,
   the lock mechanism comprising a lock lever disposed within a section of the upper rail and extending in a forward and rearward direction of the upper and lower rails, the lock lever being movably mounted on the upper rail, a nail portion formed on the lock lever and adapted to be selectively fitted into first and second engaging openings formed on one of the upper and lower rails and a third engaging opening formed on the other of the upper and lower rails through pivoting movement of the nail portion toward outside the upper rail to lock the upper rail relative to the lower rail, the third engaging opening being arranged between the first and second engaging openings, urging means positioned within the sections of the lower and upper rails for urging the lock lever toward its locking condition, and operating means for operating the lock lever.

2. The seat sliding device according to claim 1, wherein the operating means includes an operation lever having an operating portion extending forward from a front end of the upper rail and movably supported on the upper rail at a position within the upper rail, and a plate shaped elastic member mounted on the upper rail and elastically holding the operation lever.

3. The seat sliding device according to claim 1, wherein the lock lever is provided with a flair of bearing portions formed on opposite ends of the lock lever and extending in a lateral direction, the lock lever being mounted on the upper rail at the bearing portions to pivot relative to the upper rail.

4. The seat sliding device according to claim 3, further comprising a first ball engaging a front side of one of the bearing portions and second ball engaging a rear side of the other bearing portion, and a pair of curl portions formed on the upper rail, each of the pressing portions pressing one of the first and second balls to the respective bearing portion, the lock lever being mounted on the upper rail at the bearing portions through the balls and the curl portions so as to be able to pivot relative to the upper rail.

5. The seat sliding device according to claim 1, wherein the lock mechanism includes a pair of lock levers, each provided with a plurality of nail portions.

6. The seat sliding device according to claim 1, wherein the operating means includes an elastic member mounted on a holder and an operation lever engaged by the elastic member.

7. The seat sliding device according to claim 6, wherein the lock lever is integrally formed in one piece with the holder.

8. The seat sliding device according to claim 1, wherein at least one of the first, second and third engaging openings is a notch and another of the first, second and third engaging openings is a hole.

9. A seat sliding device for a vehicle comprising:
   a lower rail adapted to be fixed to a floor of the vehicle, the lower rail being provided with a plurality of engaging openings;
   an upper rail adapted to be fixed to a seat of the vehicle and movably mounted on the lower rail for forward and rearward movement, the upper rail being provided with a plurality of engaging openings and including a pair of side walls, the plurality of engaging openings of the upper rail comprising a first set of upper rail engaging openings disposed on one side of the plurality of engaging openings of the lower rail and a second set of upper rail engaging openings disposed on an opposite side of the plurality of engaging openings of the lower rail;
   a lock lever movably mounted on the upper rail at a position between the side walls of the upper rail, the lock lever including at least two outwardly extending engaging portions each adapted to be fitted into one of the engaging openings of the first set of upper rail engaging openings, one of the engaging openings of the second set of upper rail engaging openings and one of the engaging openings of the lower rail to lock the upper rail relative to the lower rail; and
   a spring member positioned between the side walls of the upper rail and applying a biasing force to the lock lever urging the engaging portions outwardly to engage the engaging openings of the upper and lower rails.

10. The seat sliding device according to claim 9, including an operation lever operatively associated with the lock lever to move the lock lever in a manner causing the engaging portions to engage the engaging openings, a portion of the operation lever being positioned between the side walls of the upper rail.

11. The seat sliding device according to claim 10, including an elastic member mounted on the upper rail and elastically engaging the operation lever.

12. The seat sliding device according to claim 10, including a holder positioned between the side walls of the upper rail, and an elastic member mounted on the holder and engaging the operation lever.

13. The seat sliding device according to claim 9, wherein the lock lever is pivotally mounted on the upper rail by way of a pair of balls, the lock lever including a pair of bearing portions at opposite ends of the lock lever and the upper rail including a pair of ball engaging portions, each of the balls being positioned between one of the bearing portions and one of the ball engaging portions.

14. The seat sliding device according to claim 9, wherein the lock lever is a first lock lever, and including a second lock lever having a plurality of outwardly extending engaging portions.

15. A seat sliding device for a vehicle comprising:

a lower rail adapted to be fixed to a floor of the vehicle;

an upper rail adapted to be fixed to a seat of the vehicle and movably mounted on the lower rail for forward and rearward sliding movement, the upper rail and lower rail together defining an interior;

a lock lever movably mounted on the upper rail and positioned within the interior of the upper and lower rails, the lock lever including engaging portions that extend outwardly towards an exterior of the upper and lower rails and engaging engaging openings in the lower and upper rails, the engaging openings including first and second engaging openings at one of the upper or lower rails and a third engaging opening at the other of the upper or lower rails, the first, second and third engaging openings being adapted to be aligned with one another to receive one of the engaging portions of the lock lever to lock the upper rail relative to the lower rail;

a spring member operatively associated with the lock lever to urge the engaging portions outwardly into engagement with the engaging openings of the upper and lower rails; and an operation member operatively associated with the lock lever to move the lock lever in a direction for disengaging the engaging portions from the engaging openings in the upper and lower rails.

16. The seat sliding device according to claim 15, wherein a portion of the operation lever is positioned within the interior of the upper and lower rails.

17. The seat sliding device according to claim 15, including an elastic member operatively associated with the operation lever to apply an urging force to the operation lever.

18. The seat sliding device according to claim 15, including a holder positioned in the interior of the upper and lower rails, and an elastic member mounted on the holder and engaging the operation lever to apply an urging force to the operation lever.

19. The seat sliding device according to claim 15, wherein the lock lever is pivotally mounted on the upper rail by way of a pair of balls, the lock lever including a pair of bearing portions at opposite ends of the lock lever and the upper rail including a pair of ball engaging portions, each of the balls being positioned between one of the bearing portions and one of the ball engaging portions.

20. The seat sliding device according to claim 15, wherein the lock lever is a first lock lever, and including a second lock lever having a plurality of engaging portions.

21. The seat sliding device according to claim 9, wherein the first set of upper rail engaging openings are notches in the upper rail, the second set of upper rail engaging openings are holes in the upper rail and the engaging openings of the lower rail are holes in the lower rail.

22. The seat sliding device according to claim 15, wherein the first engaging opening is a notch, the second engaging opening is a hole and the third engaging opening is a hole.

* * * * *